US011993447B2

(12) United States Patent
Beegle et al.

(10) Patent No.: US 11,993,447 B2
(45) Date of Patent: May 28, 2024

(54) AEROSOL SPRAYERS AND METHODS OF USING THE SAME

(71) Applicant: Silgan Dispensing Systems Corporation, Grandview, MO (US)

(72) Inventors: Peter Beegle, Midlothian, VA (US); Jacob VanBecelaere, Olathe, KS (US); Bryan Fields, Overland Park, KS (US); Brian VanHouten, Kansas City, MO (US)

(73) Assignee: Silgan Dispensing Systems Corporation, Grandview, MO (US)

(*) Notice: Subject to any disclaimer, the term of this patent is extended or adjusted under 35 U.S.C. 154(b) by 0 days.

(21) Appl. No.: 17/931,367

(22) Filed: Sep. 12, 2022

(65) Prior Publication Data

US 2023/0002144 A1 Jan. 5, 2023

Related U.S. Application Data

(63) Continuation of application No. 17/213,292, filed on Mar. 26, 2021, now Pat. No. 11,440,726.

(51) Int. Cl.

| | |
|---|---|
| ***B65D 83/20*** | (2006.01) |
| ***B05B 11/00*** | (2023.01) |
| ***B05B 11/10*** | (2023.01) |
| ***B65D 83/22*** | (2006.01) |

(52) U.S. Cl.

CPC ........ *B65D 83/206* (2013.01); *B05B 11/1057* (2023.01); *B65D 83/22* (2013.01)

(58) Field of Classification Search

CPC ... B65D 83/206; B65D 83/22; B05B 11/3057; B05B 11/1057

See application file for complete search history.

(56) References Cited

U.S. PATENT DOCUMENTS

| | | | | |
|---|---|---|---|---|
| 3,386,631 A * | 6/1968 | Kotuby | B65D 83/222 | 222/402.11 |
| 3,734,353 A * | 5/1973 | McIlhenny | B65D 83/30 | 222/402.11 |
| 4,157,774 A * | 6/1979 | Micallef | F04B 43/0063 | 222/509 |
| 5,018,647 A * | 5/1991 | Abplanalf | B65D 83/206 | 222/509 |
| 5,147,075 A * | 9/1992 | Regan | F17C 7/00 | 222/402.15 |
| 6,796,464 B1 * | 9/2004 | Tung | B65D 83/303 | 222/536 |
| 7,172,098 B2 * | 2/2007 | Garcia | B65D 83/345 | 222/402.15 |

(Continued)

FOREIGN PATENT DOCUMENTS

AU 2005100094 A4 * 3/2005 ............. B65D 83/22

*Primary Examiner* — Frederick C Nicolas

(74) *Attorney, Agent, or Firm* — Hinckley Allen & Snyder, LLP; Stephen Holmes

(57) ABSTRACT

An aerosol sprayer may be connected to an aerosol container to form an aerosol delivery system. The aerosol sprayer includes a base secured to the container, a cap secured to the base, a pivoting trigger and a nozzle which is slidably movable relative to the trigger between an extended operable position and a retracted, locked position. The nozzle and trigger have interfitting locking structures to prevent actuation of the trigger when the nozzle is in the retracted locked position.

20 Claims, 15 Drawing Sheets

(56) References Cited

U.S. PATENT DOCUMENTS

| | | | | | |
|---|---|---|---|---|---|
| 7,780,045 | B2 * | 8/2010 | Rossignol | B05B 11/1004 | 222/321.2 |
| 8,056,771 | B2 * | 11/2011 | Rossignol | B05B 11/1074 | 222/321.9 |
| 8,152,026 | B2 * | 4/2012 | Ki | B05B 11/1059 | 222/522 |
| 8,356,734 | B2 * | 1/2013 | Oshimo | B65D 83/24 | 222/402.15 |
| 8,528,837 | B2 * | 9/2013 | Kwasny | B05B 1/1645 | 222/548 |
| 9,352,896 | B2 * | 5/2016 | Deutsch | B05B 14/00 | |
| 9,586,750 | B1 | 3/2017 | Mangold | | |
| 11,370,600 | B1 * | 6/2022 | Pindor | B05B 1/30 | |
| 11,440,726 | B1 * | 9/2022 | Beegle | B65D 83/22 | |
| 11,708,210 | B2 * | 7/2023 | Spang, Jr. | B65D 83/206 | 222/402.13 |
| 2002/0134798 | A1 | 9/2002 | Lamboux | | |
| 2004/0222246 | A1 | 11/2004 | Bates | | |
| 2005/0103811 | A1 * | 5/2005 | Heukamp | B65D 83/206 | 222/402.13 |
| 2008/0023498 | A1 | 1/2008 | Bertin | | |
| 2008/0221561 | A1 | 9/2008 | Geiger | | |
| 2009/0236362 | A1 | 9/2009 | Helf | | |
| 2010/0059551 | A1 | 3/2010 | Tomkins | | |
| 2010/0224655 | A1 | 9/2010 | Ramet | | |
| 2015/0001257 | A1 * | 1/2015 | Sell | B65D 83/303 | 222/402.13 |

* cited by examiner

AEROSOL SPRAYERS AND METHODS OF USING THE SAME

CROSS-REFERENCE TO RELATED APPLICATIONS

This application is a continuation of U.S. patent application Ser. No. 17/213,292, filed Mar. 26, 2021.

BACKGROUND OF THE DISCLOSURE (1) Field of the Invention: The instant invention relates to aerosol sprayer devices and more particularly to an aerosol spray actuator having a locking mechanism.

(2) Description of Related Art: Aerosol spray devices typically include a pushbutton type spray device containing an orifice and a connection to a valve which is in turn connected to a container of product from which the aerosol product is dispensed. Actuation of the pushbutton releases a quantity of product from the aerosol container through the valve and pushbutton orifice.

More recently aerosol spray devices have been modified to look and function more like trigger sprayers and such devices may include a trigger attached to or in operable communication with a manifold which is in turn connected to the valve stem of an aerosol container. While trigger actuation is a recognized improvement for aerosol sprayers, accidental and inadvertent actuation of the trigger during both shipment and use is an ongoing issue of concern.

SUMMARY OF THE DISCLOSURE

According to exemplary embodiments of the invention, an aerosol trigger-type sprayer device may include a unique and novel locking mechanism which will prevent actuation of the trigger when engaged.

Some embodiments of the aerosol sprayer may generally comprise a base configured to be received in assembled relation with an aerosol container, a manifold configured to be received in assembled relation with a valve stem of the aerosol container, a trigger pivotably attached to the base and operably engaged with the manifold, a cap received with the base, a sliding nozzle received within the cap, and a trigger locking mechanism comprising interfitting locking formations on the nozzle and the trigger.

The nozzle may have an exit orifice at a distal end, an inlet at a proximal end and a discharge path extending therebetween. There is a manifold port in a bottom wall of the guide channel which receives a terminal end of the manifold tube which extends upwardly through the center of the base.

The nozzle is slidably received within the guide channel in the cap wherein the nozzle and the cap are configured and arranged for sliding movement of the nozzle between a retracted (locked for shipping and storage) position wherein the inlet is not aligned with the manifold port and an extended position (operable use) wherein the nozzle inlet is aligned with the manifold port. Some embodiments may include a manifold port gasket to seal the connection therebetween.

In operable use of the aerosol sprayer, the locking mechanism is engaged and the trigger is inoperable when the nozzle is in the retracted position, and the locking mechanism is disengaged and the trigger is operable when the nozzle is in the extended position.

In some embodiments, the locking mechanism comprises one or more latch arms or a latch bolt on the nozzle and corresponding latch receiver(s) on the trigger body.

In some embodiments, the locking mechanism comprises one or more latch arms on the trigger and corresponding latch receivers on the nozzle body.

While embodiments of the invention have been described as having the features recited, it is understood that various combinations of such features are also encompassed by particular embodiments of the invention and that the scope of the invention is limited by the claims and not the description.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE EXEMPLARY EMBODIMENTS

Figure 1:
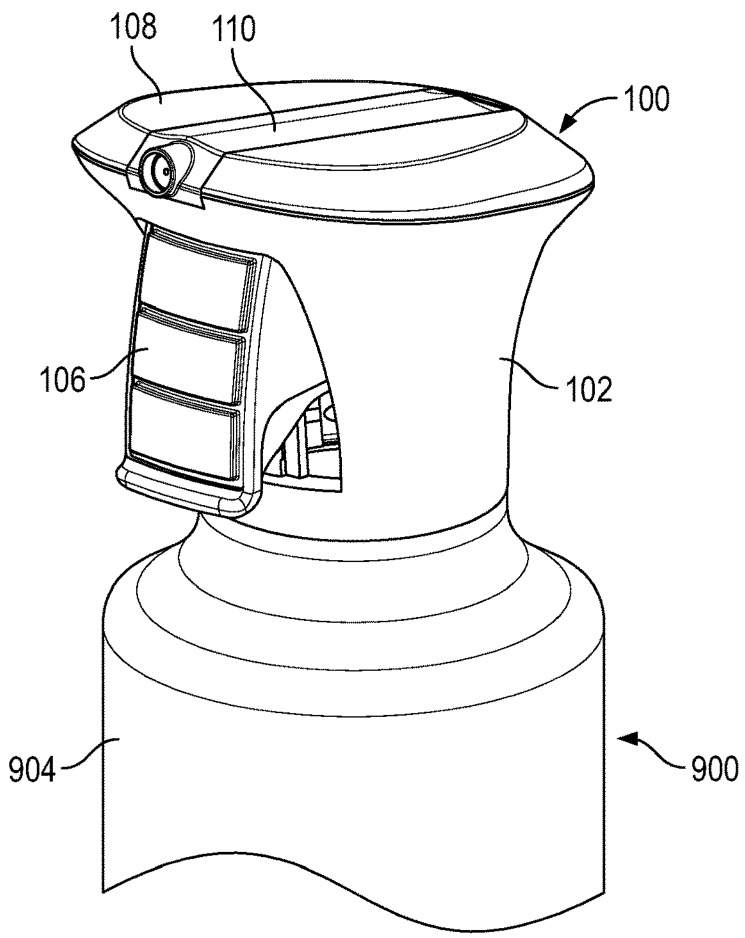
FIG. 1 is a perspective view of an exemplary embodiment of an aerosol sprayer in accordance with the teachings of the present disclosure.
Figure 2:
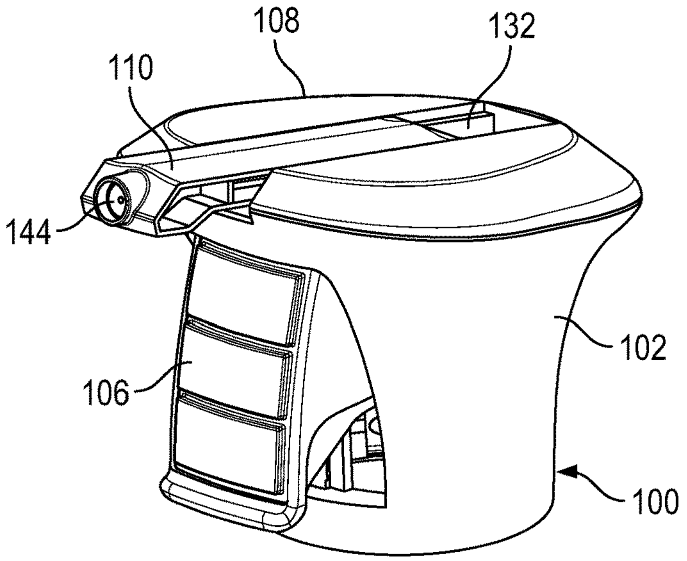
FIG. 2 is another perspective view thereof with the nozzle in the extended position.
Figure 3:
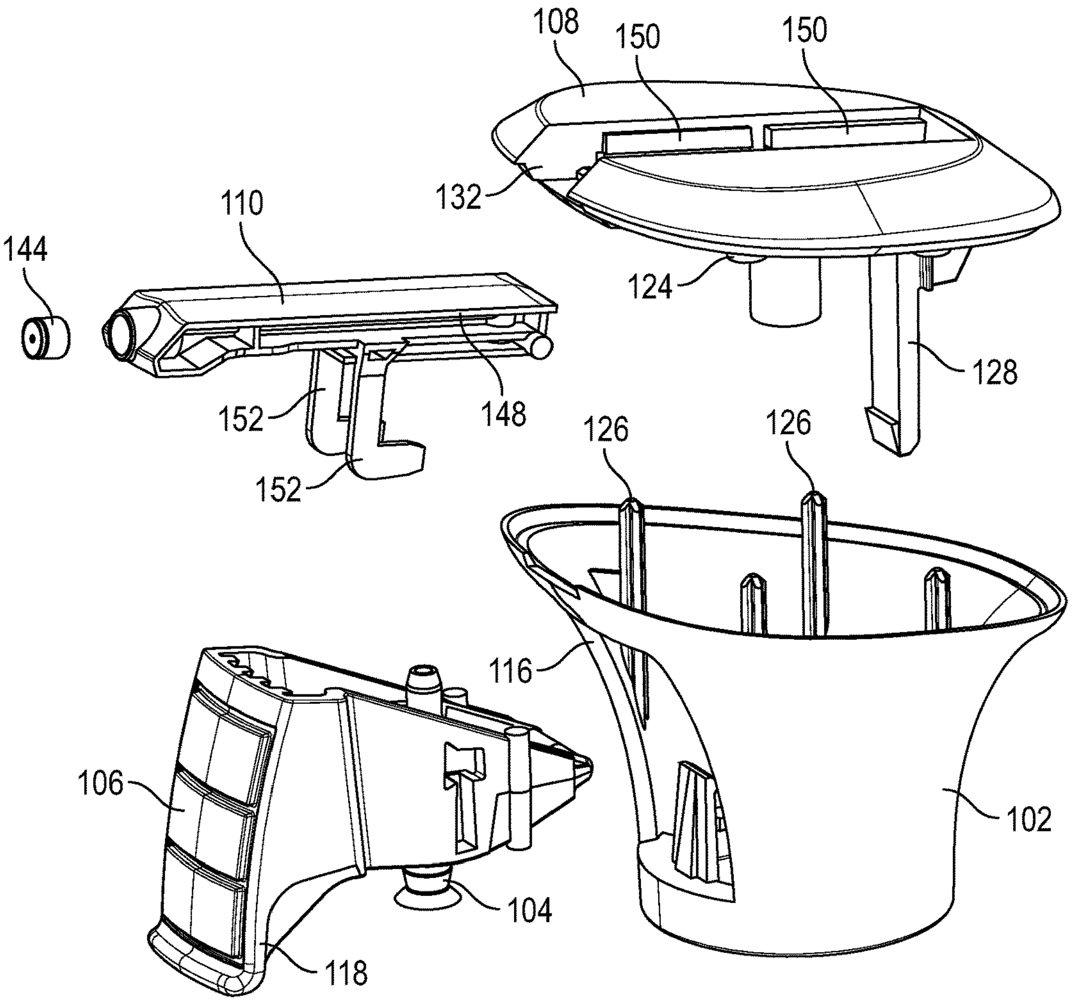
FIG. 3 is an exploded perspective view thereof.
Figure 4:
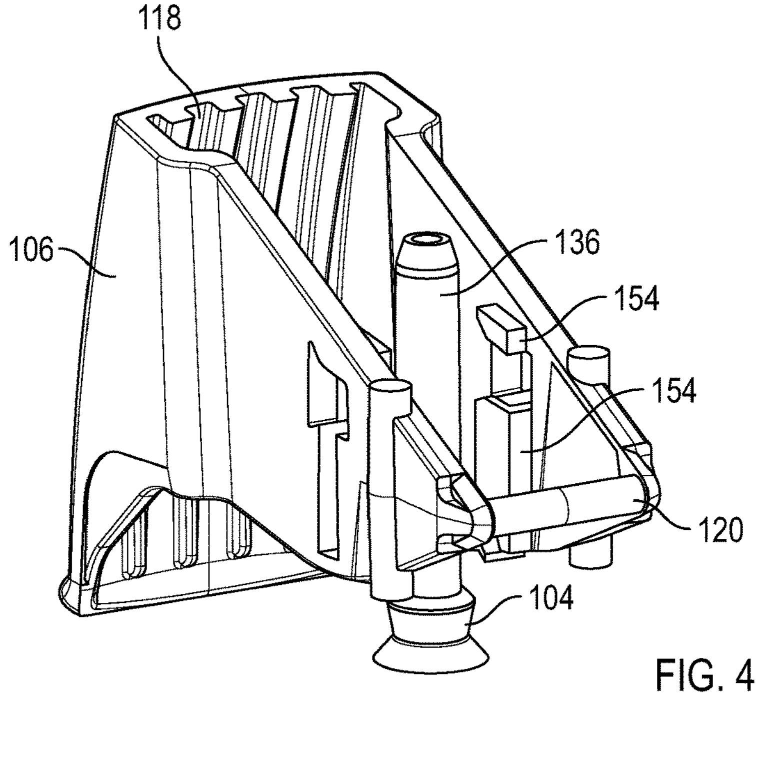
FIG. 4 is a perspective view of an exemplary trigger body in accordance with the teachings of the present disclosure.
Figure 5:
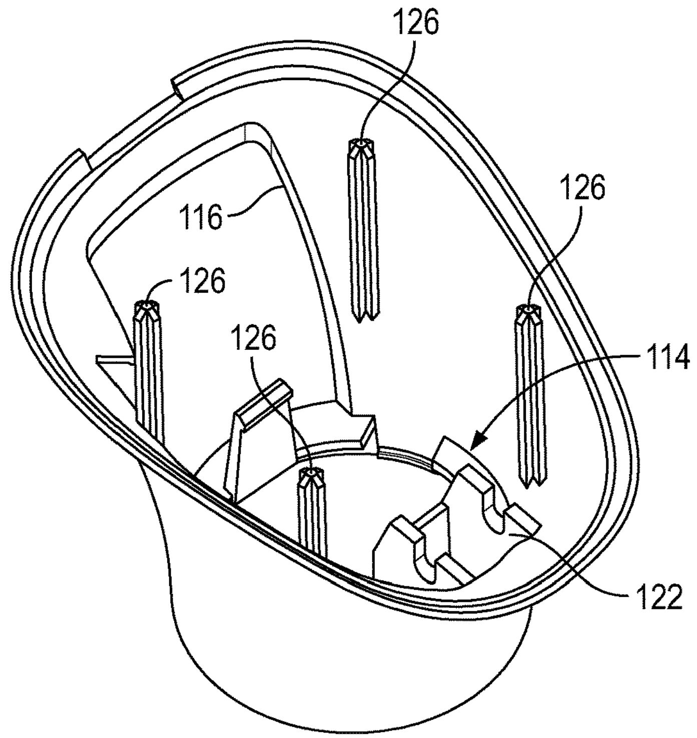
FIG. 5 is a perspective view of an exemplary base structure.
Figure 6:
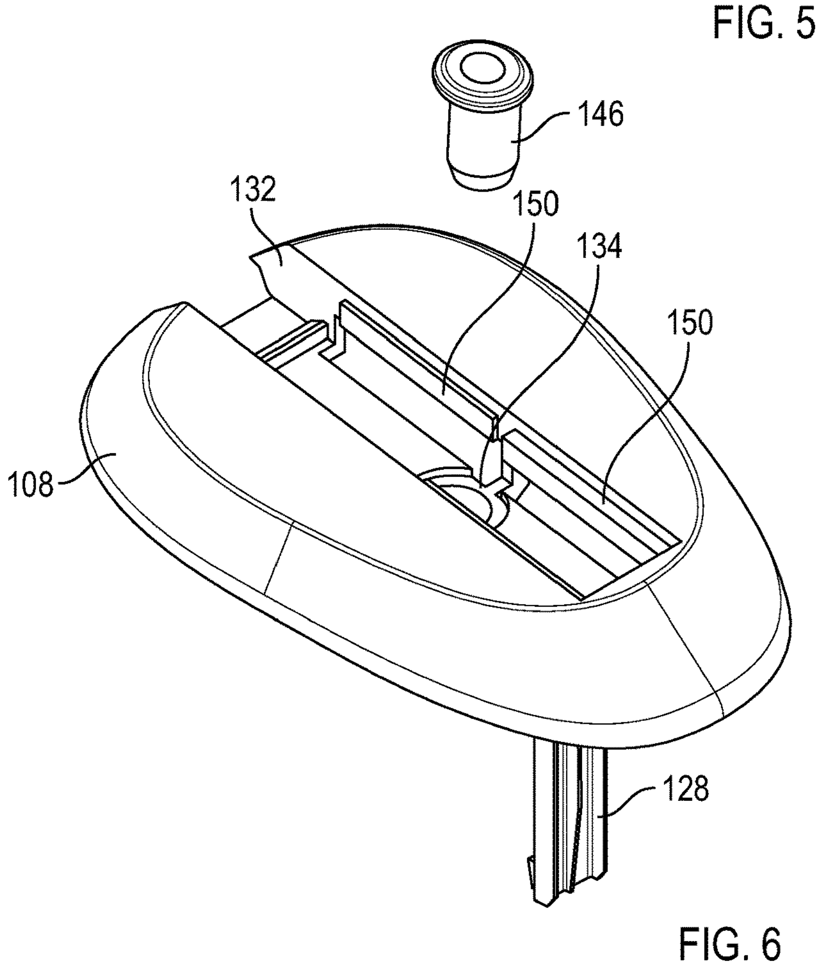
FIG. 6 is a perspective view of an exemplary cap structure.
Figure 7:
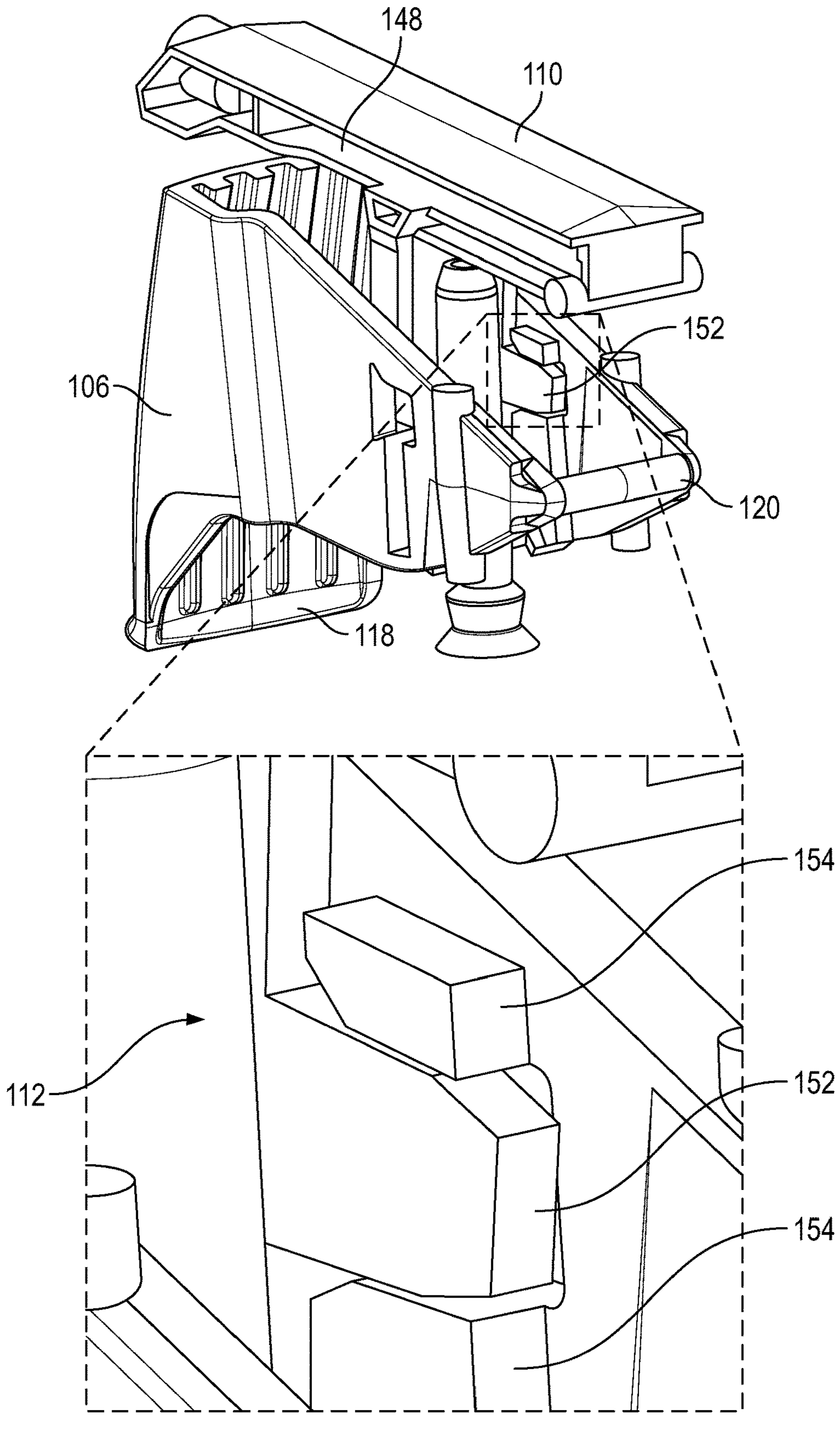
FIG. 7 is an enlarged perspective view of the exemplary locking arrangement between the nozzle and trigger.
Figure 8:
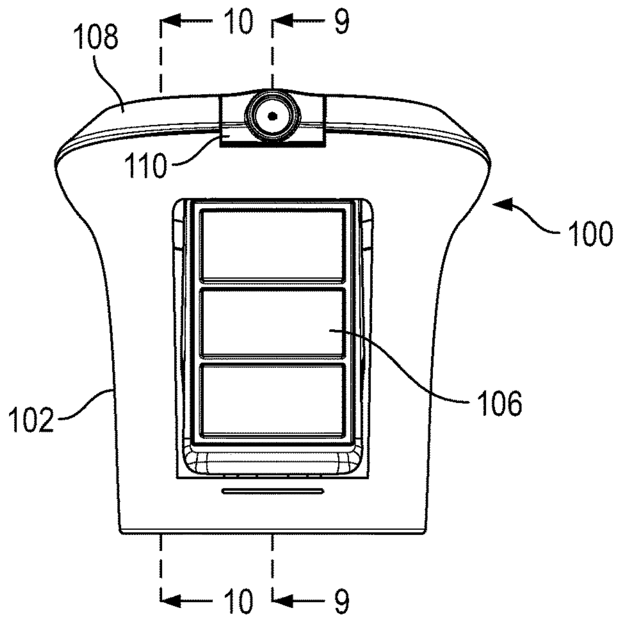
FIG. 8 is a front view of the sprayer device with the nozzle in the retracted position.
Figure 9:
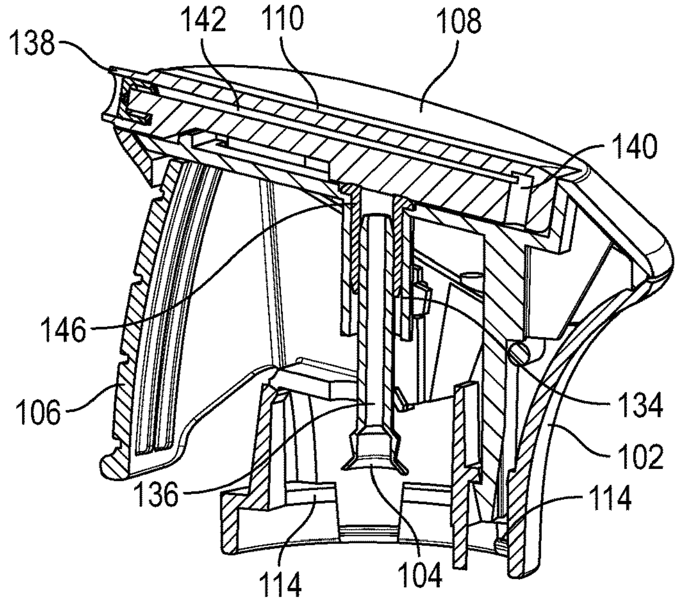
FIGS. 9 and 10 are cross-section views thereof as taken along lines 9-9 and 10-10 of FIG. 8.
Figure 10:
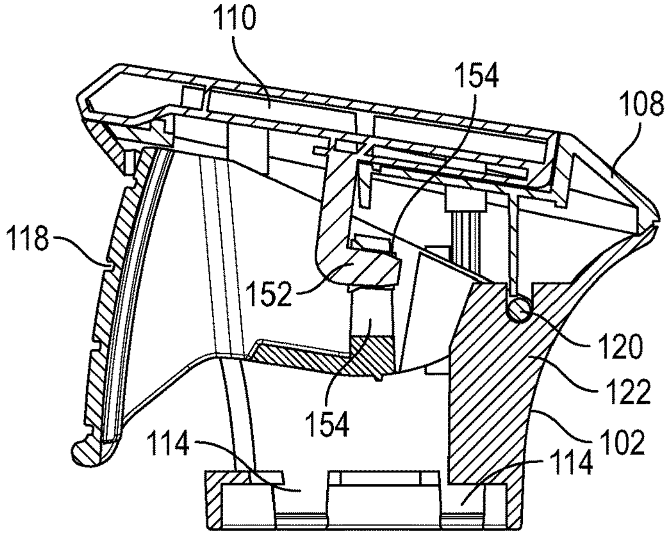
Figure 11:
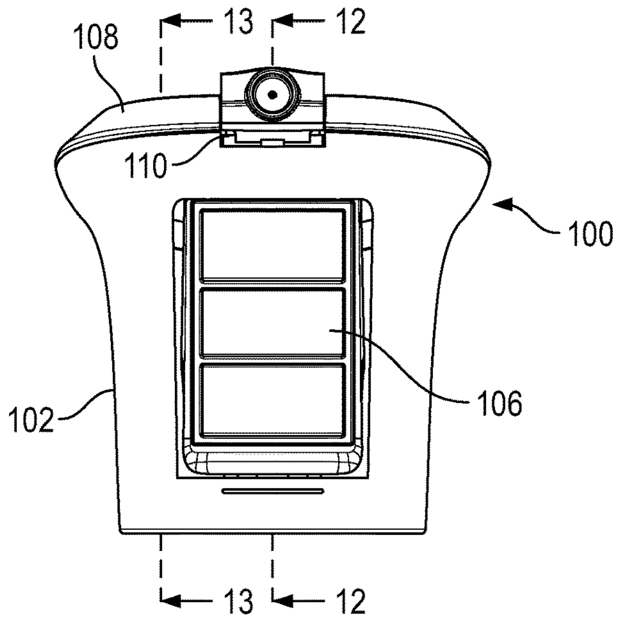
FIG. 11 is a front view of the sprayer device with the nozzle in the extended position.
Figure 12:
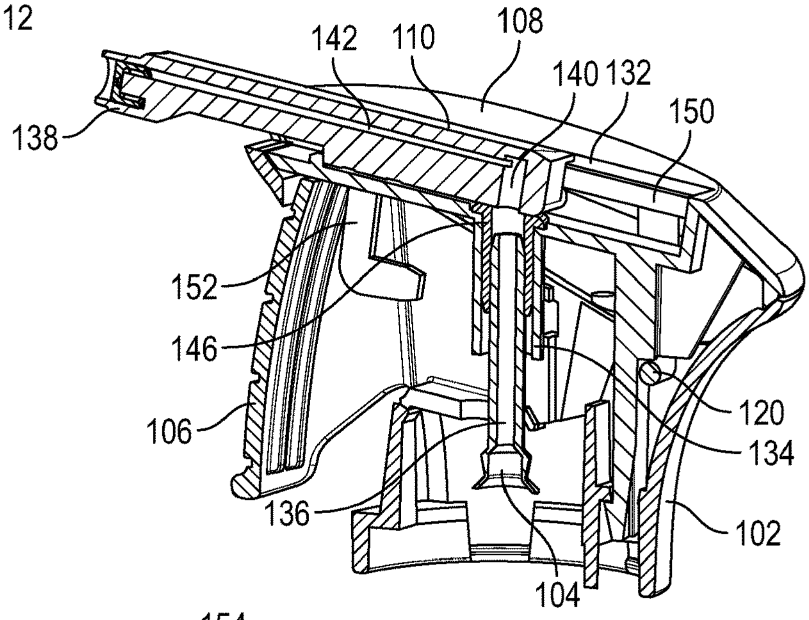
FIGS. 12 and 13 are cross-section views thereof as taken along lines 12-12 and 13-13 of FIG. 11.
Figure 13:
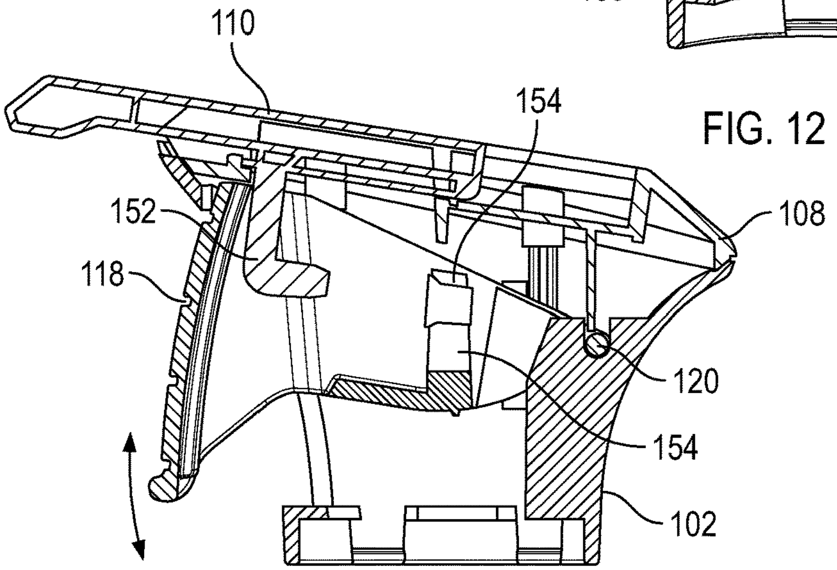
Figure 14:
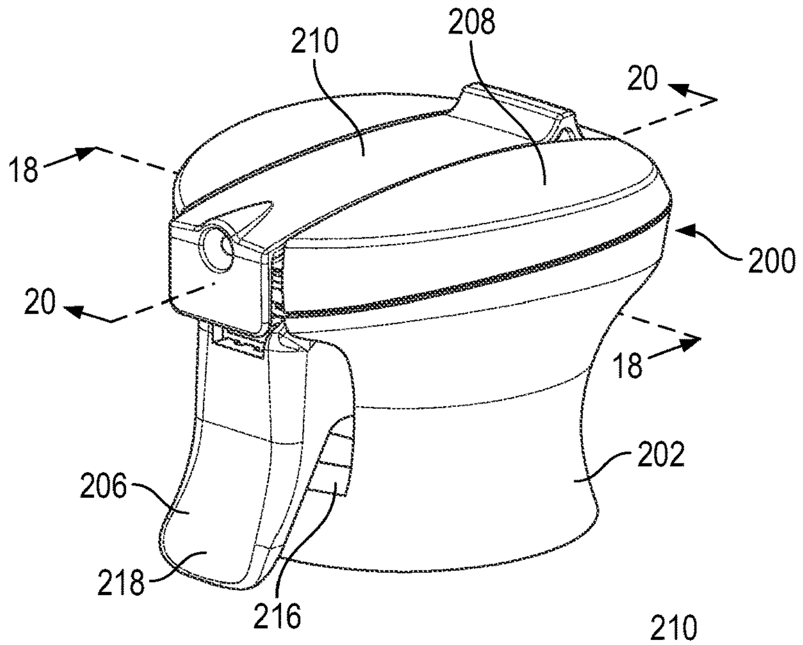
FIG. 14 is a perspective view of another exemplary embodiment of an aerosol sprayer in accordance with the teachings of the present disclosure.
Figure 15:
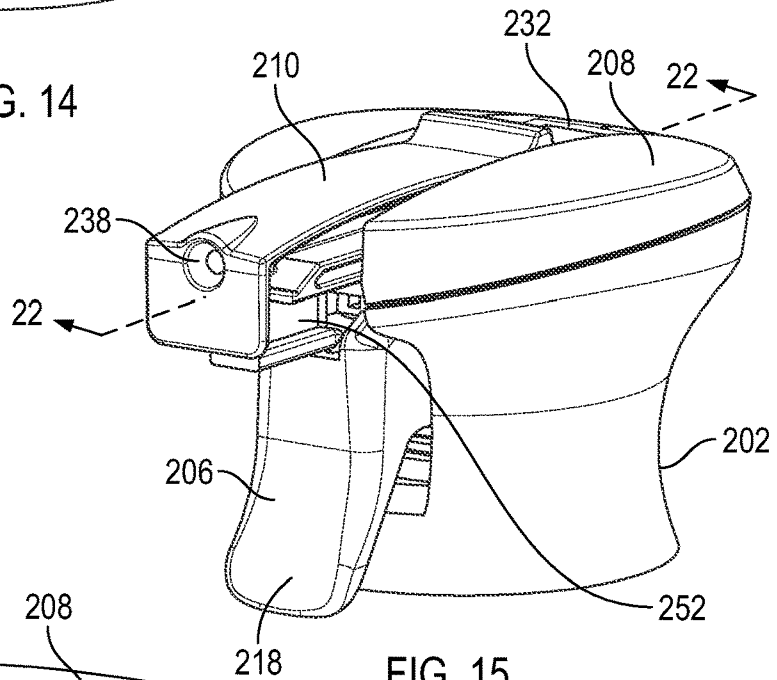
FIG. 15 is a perspective view thereof with the nozzle in the extended position.
Figure 16:
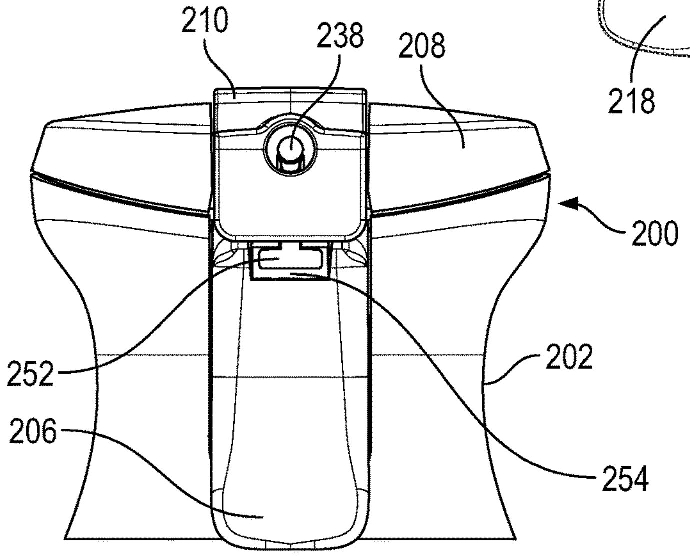
FIG. 16 is a front view thereof.
Figure 17:
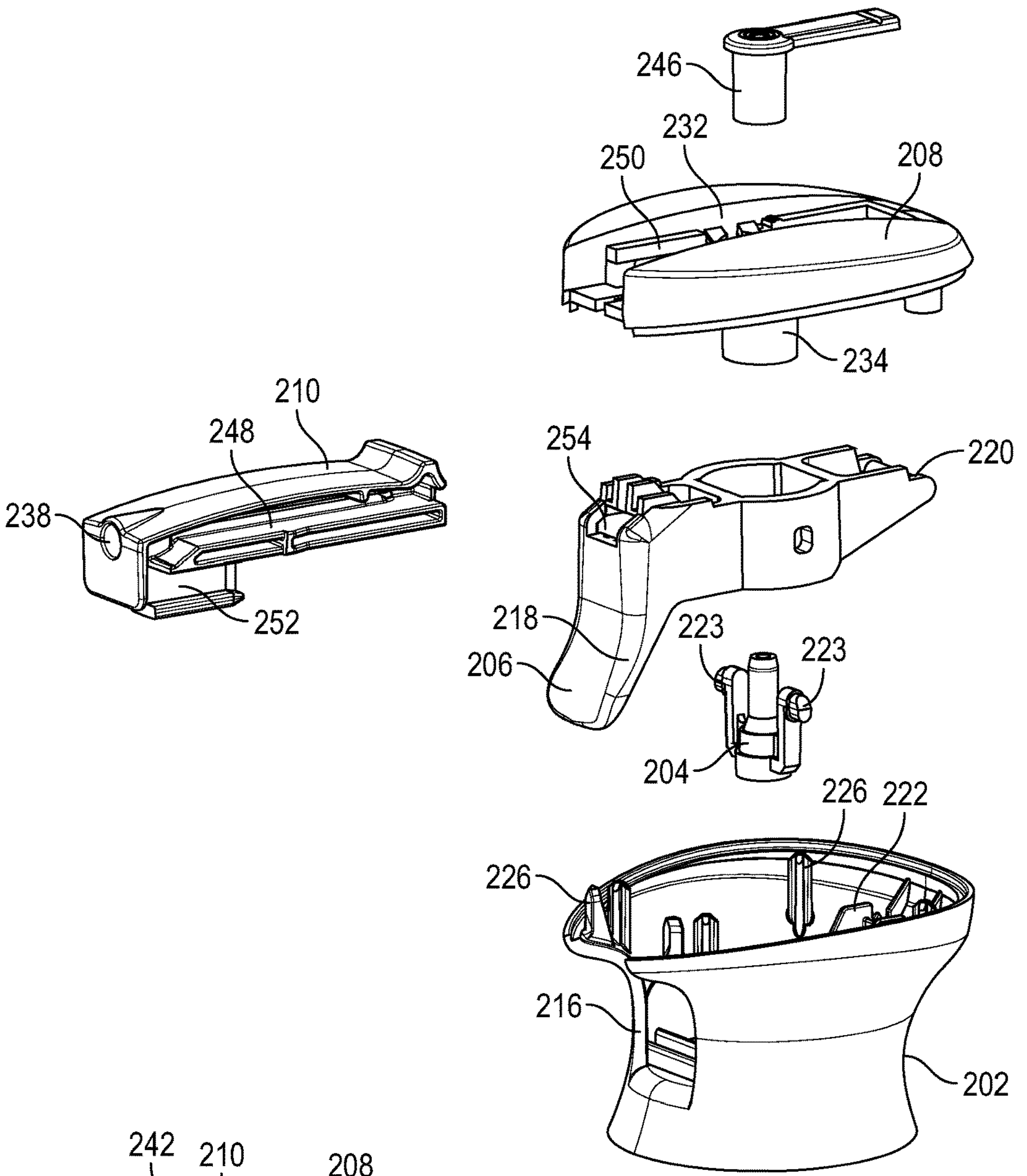
FIG. 17 is an exploded perspective view thereof.
Figure 18:
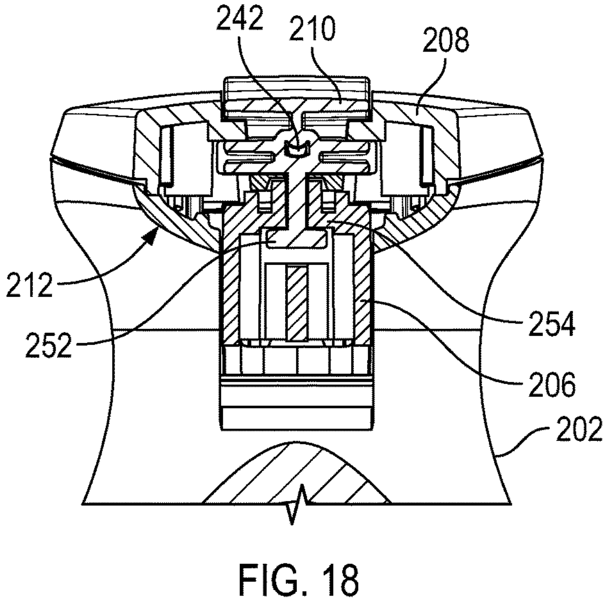
FIG. 18 is a cross-sectional view thereof taken along line 18-18 of FIG. 14.
Figure 19:
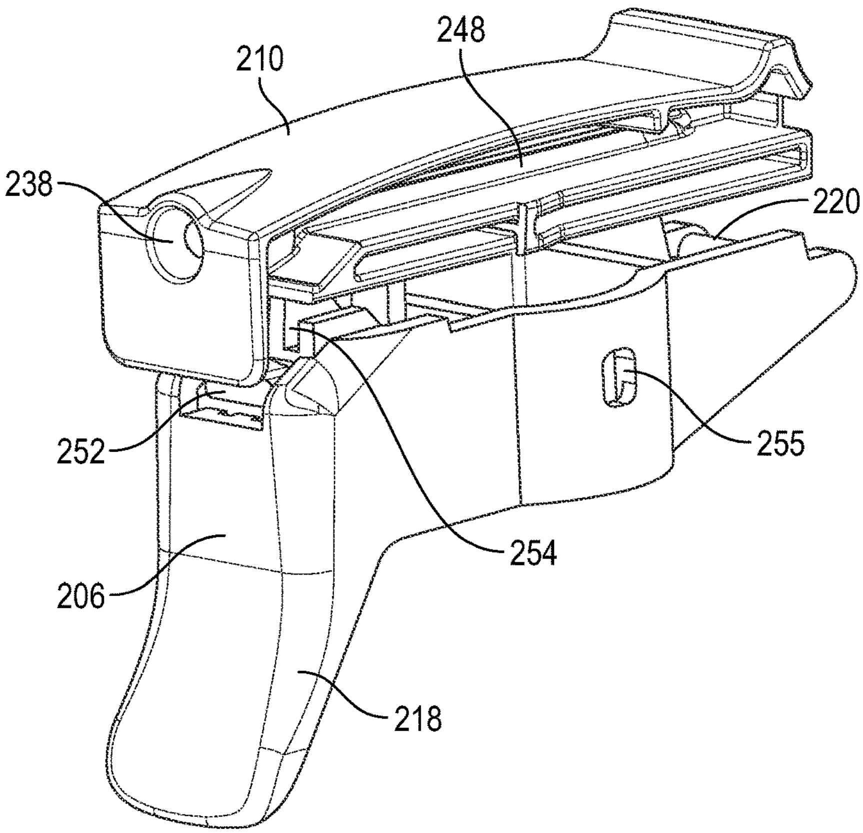
FIG. 19 is an enlarged perspective view of the trigger and nozzle in the retracted position.
Figure 20:
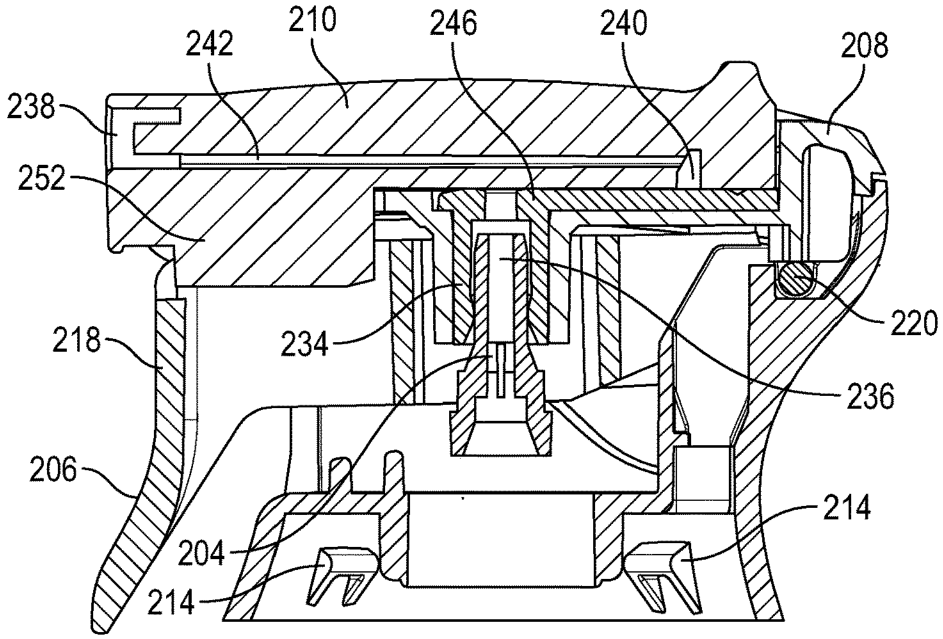
FIG. 20 is a cross-sectional view thereof taken along line 20-20 of FIG. 14.
Figure 21:
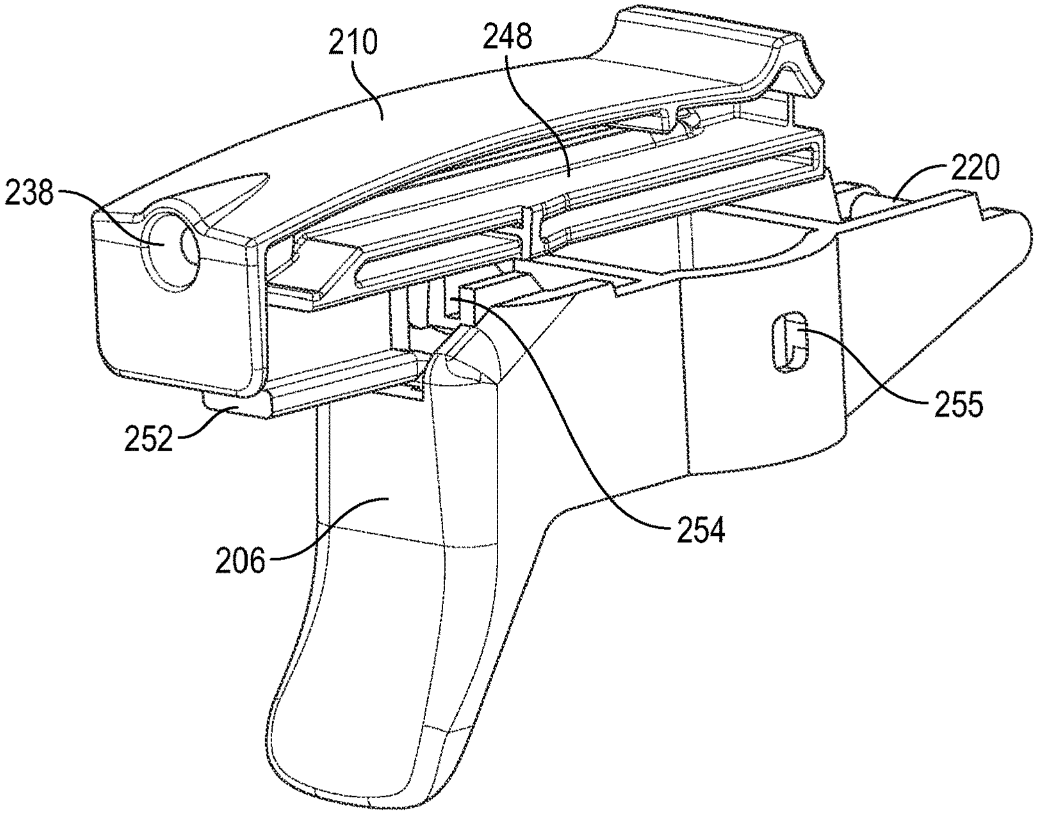
FIG. 21 is an enlarged perspective view of the trigger and nozzle in the extended position.
Figure 22:
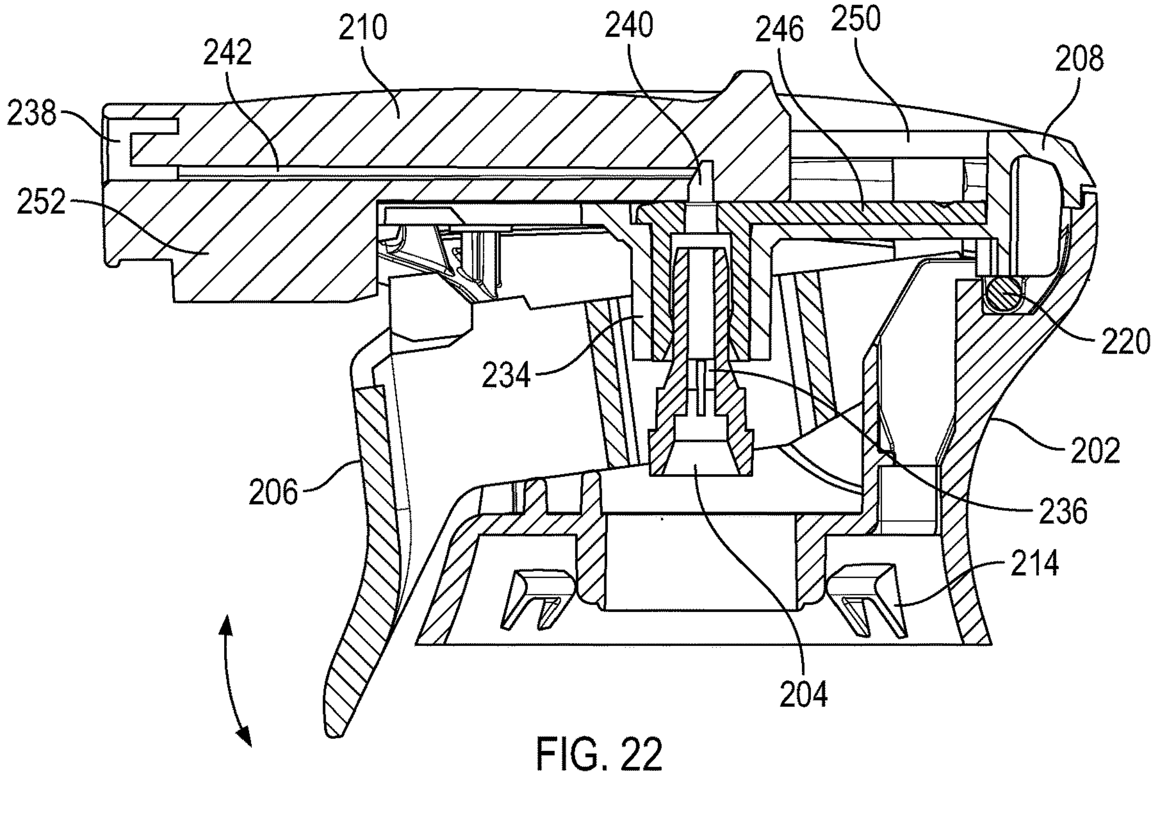
FIG. 22 is a cross-sectional view thereof taken along line 22-22 of FIG. 15.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

According to some embodiments of the invention, an aerosol sprayer may generally comprise a base configured to be received in assembled relation with an aerosol container, a manifold configured to be received in assembled relation with a valve stem of the aerosol container, a trigger pivotably attached to the base and operably engaged with the manifold, a cap received with the base, a sliding nozzle received within the cap, and a trigger locking mechanism comprising interfitting locking formations on the nozzle and the trigger.

The nozzle may have an exit orifice at a distal end, an inlet at a proximal end and a discharge path extending therebetween. There is a manifold port in a bottom wall of the guide channel which receives a terminal end of the manifold tube which extends upwardly through the center of the base.

The nozzle is slidably received within the guide channel wherein the nozzle and the cap are configured and arranged for sliding movement of the nozzle between a retracted (locked for shipping and storage) position wherein the inlet is not aligned with the manifold port and an extended position (operable use) wherein the nozzle inlet is aligned with the manifold port. Some embodiments may include a manifold port gasket to seal the connection therebetween.

In operable use of the aerosol sprayer the locking mechanism is engaged and the trigger is inoperable when the nozzle is in the retracted position, and the locking mechanism is disengaged and the trigger is operable when the nozzle is in the extended position. Furthermore, when the nozzle in an extended position, the aerosol orifice or exit location is extended further away from the fingers or hand of an operator using the aerosol sprayer. Thus, any drips, residual collection of product, or errant spray from the aerosol sprayer is less likely to contact the user.

Aerosol sprayers according to various embodiments of the invention may be made from moldable resin or plastic materials or other desirable materials. For example, a base may be molded from any desired resin or plastic. Similarly, a trigger may be molded from any desired resin or plastic. The materials used to form components of an aerosol actuator according to embodiments of the invention may also include other properties and may be colored in different manners to produce different aesthetic looks. For example, a base may be molded with one color and a trigger molded in another color. Embodiments of the invention are not limited by the material used to make the components of an aerosol actuator.

Aerosol sprayers according to various embodiments of the invention may be attached to any type of container as desired. For example, a conventional metal aerosol can may be used as a container with various embodiments of the invention. In other embodiments, a plastic container may be used. Also, any shaped container may be used with various embodiments of the invention.

During operation of an aerosol actuator connected to a container according to various embodiments of the invention, a force may be applied to a trigger portion of the aerosol actuator. As force is applied to the trigger portion, the manifold moves. Upon reaching a certain force, the manifold may move a distance sufficient to open a valve to which the manifold is attached, allowing product to flow from a container, through the valve and into a product flow path in the manifold. Product may then exit the orifice. Upon release or decreased force upon the trigger portion, the trigger and manifold return to a non-actuated state in which the valve is moved into a closed position and the flow of product through the manifold ceases. Actuation of the trigger may be repeated as desired.

Referring now to FIGS. 1-13, an aerosol sprayer 100 according to certain embodiments may comprise a base 102 configured to be received in assembled relation with an aerosol container 900, a manifold 104 configured to be received in assembled relation with a valve stem 902 of the aerosol container 900, a trigger 106 pivotably attached to the base 102 and operably engaged with the manifold 104, a cap 108 received with the base 102, a sliding nozzle 110 received within the cap 108, and a trigger locking mechanism generally indicated at 112 comprising interfitting locking formations on the nozzle 110 and the trigger 106.

The aerosol container 900 includes a body portion 904, and an annular upper lip 906. The valve stem 902 may be centrally located within the annular lip 906 as known in the art.

Figure 29:
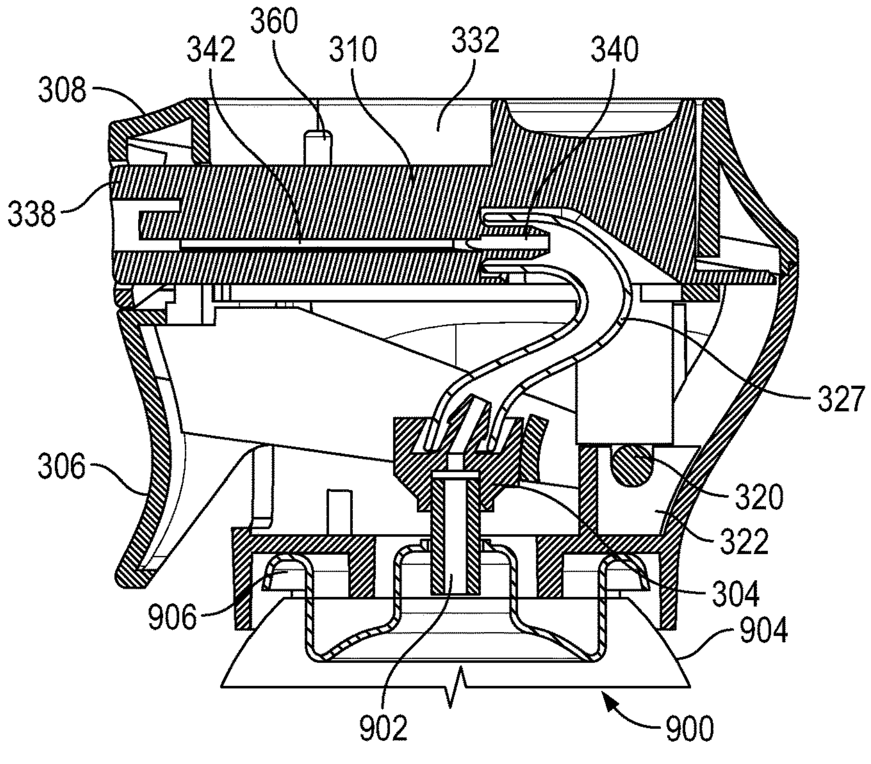
FIG. 29 is a cross-sectional view thereof taken along line 29-29 of FIG. 23.

The base 102 according to some embodiments of the invention may include snap features 114 or other container connections on a lower peripheral edge thereof which may snapfit or otherwise fasten to the lip 906 of the aerosol container 900 (see FIG. 29) or other container features. The base 102 may be ergonomically shaped as desired and may further be shaped or configured to mate with and receive the trigger 106 which may extend through a window 116 or slot in front portion of the base 102. The trigger 106 may include an outward facing lever portion 118 or other feature to which force may be applied to move the manifold 104. The rearward portion includes a pivot 120 which may be snap received with a pivot mount 122 formed in the rearward portion of the base 102 whereby an inward and downward pivoting of the trigger 106 forcibly moves the manifold 104 to release aerosol product from the valve stem 902.

The manifold 104 in some embodiments may be integrally molded with the trigger body and may be configured to mate with a valve stem 902 fixed to the aerosol container 900. As noted above, the manifold 104 moves with the trigger 106 to tilt the valve stem 902, open the valve and release aerosol product.

In some embodiments, the cap 108 may include one or more post receptacles 124 or posts which may mate with or attach to one or more posts 126 or post receptacles of the base 102. The posts 124 and post receptacles 126 may provide support to the sprayer structure and may be used to hold the cap 108 in assembled relation with the base 102. The cap 108 may also include one or more snap attachments 128 which may mate with one of more snap fitments 130 on the base, or vice versa. The snap attachments 128 and fitments 130 may be shaped, formed or otherwise configured such that they may be pressed, snapped or otherwise attached to reciprocal features. The cap 108 may further include an elongated guide channel 132 on an upper surface thereof extending longitudinally front to back of the sprayer and in alignment with the central pivoting plane of the trigger 106. A manifold port 134 may be provided through a bottom wall of the guide channel 132 which receives a terminal end of the manifold tube 136 which extends upwardly through the center of the base 102.

In some embodiments, the nozzle 110 may include an elongated body having an exit orifice 138 at a distal end, an inlet 140 at a proximal end and a discharge path 142 extending therebetween. An orifice cup 144 may be received within the exit orifice 138 to provide a desired spray pattern.

The nozzle 110 is slidably received within the guide channel 132 wherein the nozzle 110 and the cap 108 are configured and arranged for sliding movement of the nozzle 110 between a retracted (shipping and storage) position (FIGS. 1 and 7-10) wherein the inlet 140 is not aligned with the manifold port 134 and an extended (operable use) position (FIGS. 2 and 11-13) wherein the nozzle inlet 140 is aligned with the manifold port 134. Some embodiments may include a manifold port gasket 146 to seal the connection therebetween. The nozzle 110 and the guide channel 132 may include interfitting guides or shoulders for retaining the nozzle 110 within the guide channel 132 and for guiding sliding movement of the nozzle 110 within the guide channel 132. Some embodiments of the guides may include grooves 148 formed within the side walls of the nozzle body 110 and corresponding shoulders 150 formed on the inner side surfaces of the guide channel 132.

The locking mechanism 112 of the aerosol sprayer 100 may in some embodiments comprise a latch on the nozzle 110 and a latch receiver on the trigger 106. More specifically, the latch may comprise an L-shaped latch arm or pair of latch arms 152 which extend downwardly and rearwardly from a central portion of the nozzle 110. A pair of spaced arms 152 may be utilized to balance the locking surfaces. The corresponding latch receiver or receivers may comprise vertically spaced latch tabs 154 on side wall portions of the trigger 106. The latch tabs 154 form latching notches into which the latch arms 152 are received (See enlarged detail in FIG. 7) preventing movement of the trigger 106 relative to the base 102 and cap 108.

In operable use of the aerosol sprayer 100 the locking mechanism 112 is locked and the trigger 106 is inoperable when the nozzle 110 is in the retracted position (FIGS. 1 and 7-10), and the locking mechanism 112 is released and the trigger 106 is operable when the nozzle 110 is slid forwardly into the extended position (FIGS. 2 and 11-13) moving the latch arms 152 out from between the tabs 154 and aligning the nozzle inlet 140 with the manifold port 134.

An aerosol sprayer according to another exemplary embodiment of the invention is illustrated in FIGS. 14-22 and generally indicated at 200.

An aerosol sprayer 200 according to certain embodiments may comprise a base 202 configured to be received in assembled relation with an aerosol container 900, a manifold 204 configured to be received in assembled relation with a valve stem 902 of the aerosol container 900, a trigger 206 pivotably attached to the base 202 and operably engaged with the manifold 204, a cap 208 received with the base 202, a sliding nozzle 210 received within the cap 108, and a trigger locking mechanism 212 comprising interfitting locking formations on the nozzle 210 and the trigger 206.

The base 202 according to some embodiments of the invention may include snap features 214 or other container connections on a lower peripheral edge thereof which may snapfit or otherwise fasten to the lip 906 of the aerosol container or other container features. The base 202 may be shaped or configured to mate with and receive the trigger 206 which may extend through a window 216 or slot in front portion of the base 202. The trigger 206 may include an outward facing lever portion 218 or other feature to which force may be applied to move the manifold 204. The rearward portion includes a pivot 220 which may be snap received with a pivot mount 222 formed in the rearward portion of the base 202 whereby an inward and downward pivoting of the trigger 206 forcibly moves the manifold 204 to release aerosol product from the valve stem.

The manifold 204 in some embodiments may be molded separately from the trigger body 206 and may be configured to mate with a valve stem 906 fixed to the aerosol container. The manifold 204 may be operably engaged with the trigger 206 by symmetrically opposed pivot pins 223 which extend through openings 225 in the trigger walls such that the manifold 204 rocks or tilts the valve stem 902 to open the valve and release aerosol product.

In some embodiments, the cap 208 may include one or more post receptacles 224 or posts which may mate with or attach to one or more posts 226 or post receptacles of the base 202. The posts and post receptacles may provide support to the sprayer structure and may be used to hold the cap 208 in assembled relation with the base 202. The cap may further include an elongated guide channel 232 on an upper surface thereof extending longitudinally front to back of the sprayer and in alignment with the pivoting plane of the trigger 206. A manifold port 234 may be provided through a bottom wall of the guide channel 232 which receives a terminal end of the manifold tube 236 which extends upwardly through the center of the base.

In some embodiments, the nozzle 110 may include an elongated body having an exit orifice 238 at a distal end, an inlet 240 at a proximal end and a discharge path 242 extending therebetween.

The nozzle 210 is slidably received within the guide channel 232 wherein the nozzle 210 and the cap 208 are configured and arranged for sliding movement of the nozzle

210 relative to the cap 208 and trigger 206 between a retracted (shipping and storage) position (FIGS. 14, 16, 19 and 20) wherein the nozzle inlet 240 is not aligned with the manifold port 234 and an extended (operable use) position (FIGS. 15, 21 and 22) wherein the nozzle inlet 240 is aligned with the manifold port 234. Some embodiments may include a manifold port gasket 246 to seal the connection therebetween.

The nozzle body 210 and the guide channel 232 may include interfitting guides or shoulders for retaining the nozzle 210 within the guide channel 232 and for guiding sliding movement of the nozzle 210 within the guide channel. Some embodiments of the guides may include grooves 248 formed within the side walls of the nozzle body 210 and corresponding shoulders 250 formed on the inner side surfaces of the guide channel 232.

The locking mechanism of the aerosol sprayer may in some embodiments comprise a latch on the nozzle 210 and a latch receiver on the trigger. More specifically, the latch may comprise a latch bolt 252 which extends downwardly from a forward or distal portion of the nozzle 210. The corresponding latch receiver may comprise notch 254 on the forward or front portion of the trigger lever 218. The latch bolt 252 and notch 254 may have interfitting profiles, such as a T-shaped profile (See FIG. 18) or a dovetail shaped profile (not shown), or other interfitting profile.

In operable use of the aerosol sprayer 200 the locking mechanism 212 is locked and the trigger 208 is inoperable when the nozzle 210 is in the retracted position (FIGS. 14, 16, 19 and 20) (latch bolt 252 residing in the latch notch 254 and inlet 240 not aligned), and the locking mechanism 212 is released and the trigger 206 is operable when the nozzle 210 is slid forwardly into the extended position (FIGS. 15, 21 and 22) (latch bolt 252 out of the notch 254 and the inlet 240 aligned).

Another exemplary aerosol sprayer 300 according to certain embodiments may comprise a base 302 configured to be received in assembled relation with an aerosol container 900, a manifold 304 configured to be received in assembled relation with a valve stem 902 of the aerosol container, a trigger 306 pivotably attached to the base 302 and operably engaged with the manifold 304, a cap 308 received with the base 302, a sliding nozzle 310 received within the cap 308, and a trigger locking mechanism 312 comprising interfitting locking formations on the nozzle 310 and the trigger 306.

The base 302 according to some embodiments of the invention may include snap features 314 or other container connections on a lower peripheral edge thereof which may snapfit or otherwise fasten to the lip 906 of the aerosol container or other container features. The base 302 may be shaped or configured to mate with and receive the trigger 306 which may extend through a window 316 or slot in front portion of the base. The trigger 306 may include an outward facing lever portion 318 or other feature to which force may be applied to move the manifold 304. The rearward portion includes a pivot 320 which may be snap received with a pivot mount 322 formed in the rearward portion of the base 302 whereby an inward and downward pivoting of the trigger 306 forcibly moves the manifold 304 to release aerosol product from the valve stem 902.

The manifold 304 in some embodiments may be molded separately from the trigger body 306 and may be configured to mate with a valve stem fixed to the aerosol container. The manifold 306 may be operably engaged with the trigger 306 by symmetrically opposed pivot pins 323 which extend through openings 325 in the trigger walls such that the manifold 304 rocks or tilts the valve stem 902 to open the valve and release aerosol product. The manifold 304 may in some embodiments further include a flexible manifold hose 327 which connects an outlet of the manifold 304 with an inlet port 340 of the nozzle 310 (See FIG. 29).

In some embodiments, the cap 308 may include one or more post receptacles 324 or posts which may mate with or attach to one or more posts 326 or post receptacles of the base 302. The posts and post receptacles may provide support to the sprayer structure and may be used to hold the cap 308 in assembled relation with the base 302. The cap 308 may further include an elongated guide channel 332 on an upper surface thereof extending longitudinally front to back of the sprayer and in alignment with the pivoting plane of the trigger 306. A manifold opening or slot 334 may be provided through a bottom wall of the guide channel 332 to allows the flexible hose 327 of the manifold 304 to engage with the inlet port 340 of the nozzle 310.

In some embodiments, the nozzle 310 may include an elongated body having an exit orifice 338 at a distal end, an inlet port 340 at a proximal end and a discharge path 342 extending therebetween.

Figure 23:
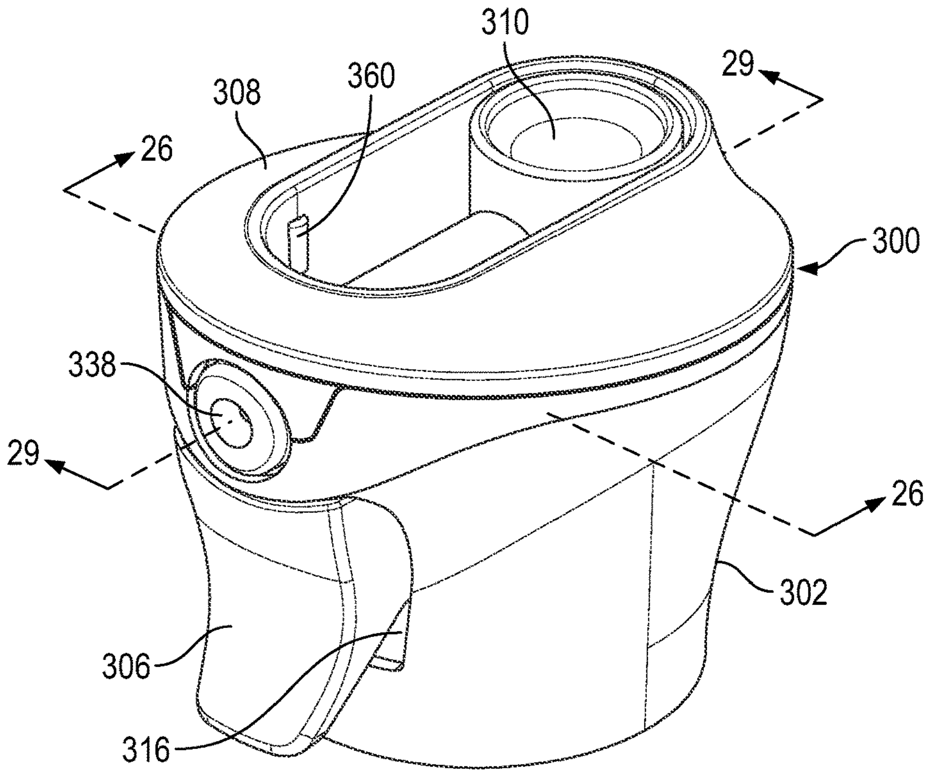
FIG. 23 is a perspective view of a further exemplary embodiment of an aerosol sprayer in accordance with the teachings of the present disclosure.
Figure 24:
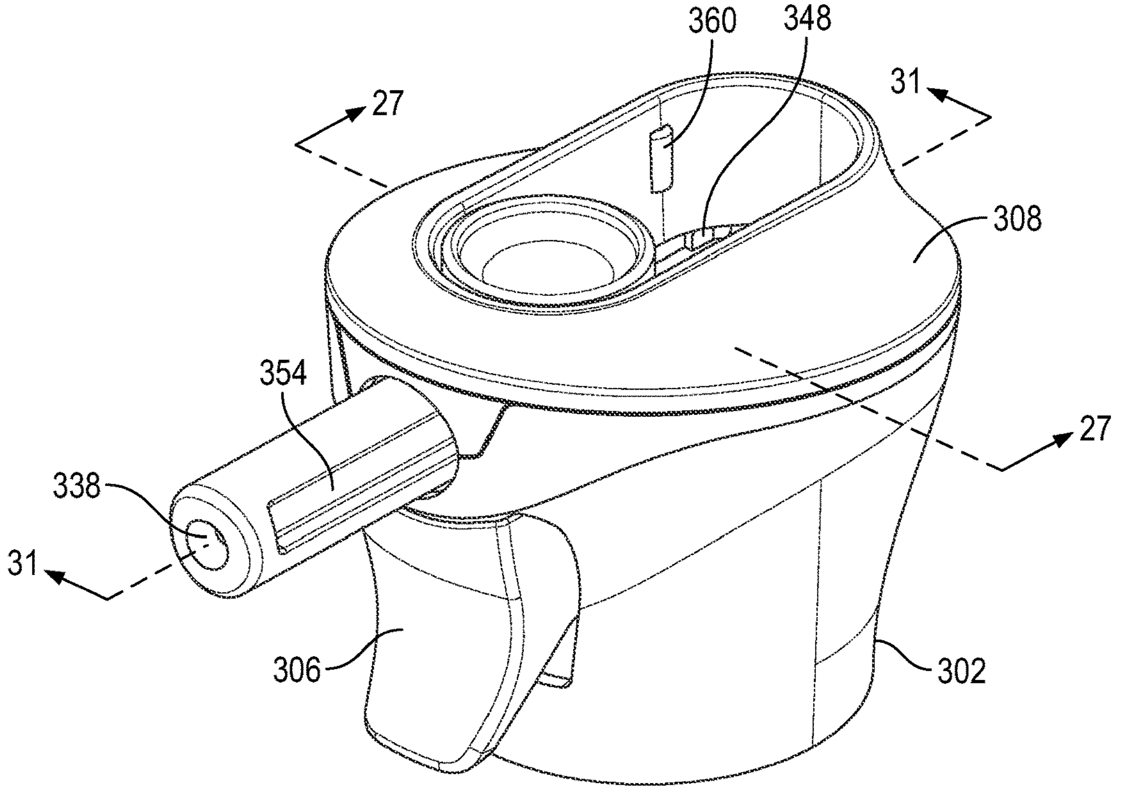
FIG. 24 is a perspective view thereof with the nozzle in the extended position.
Figure 25:
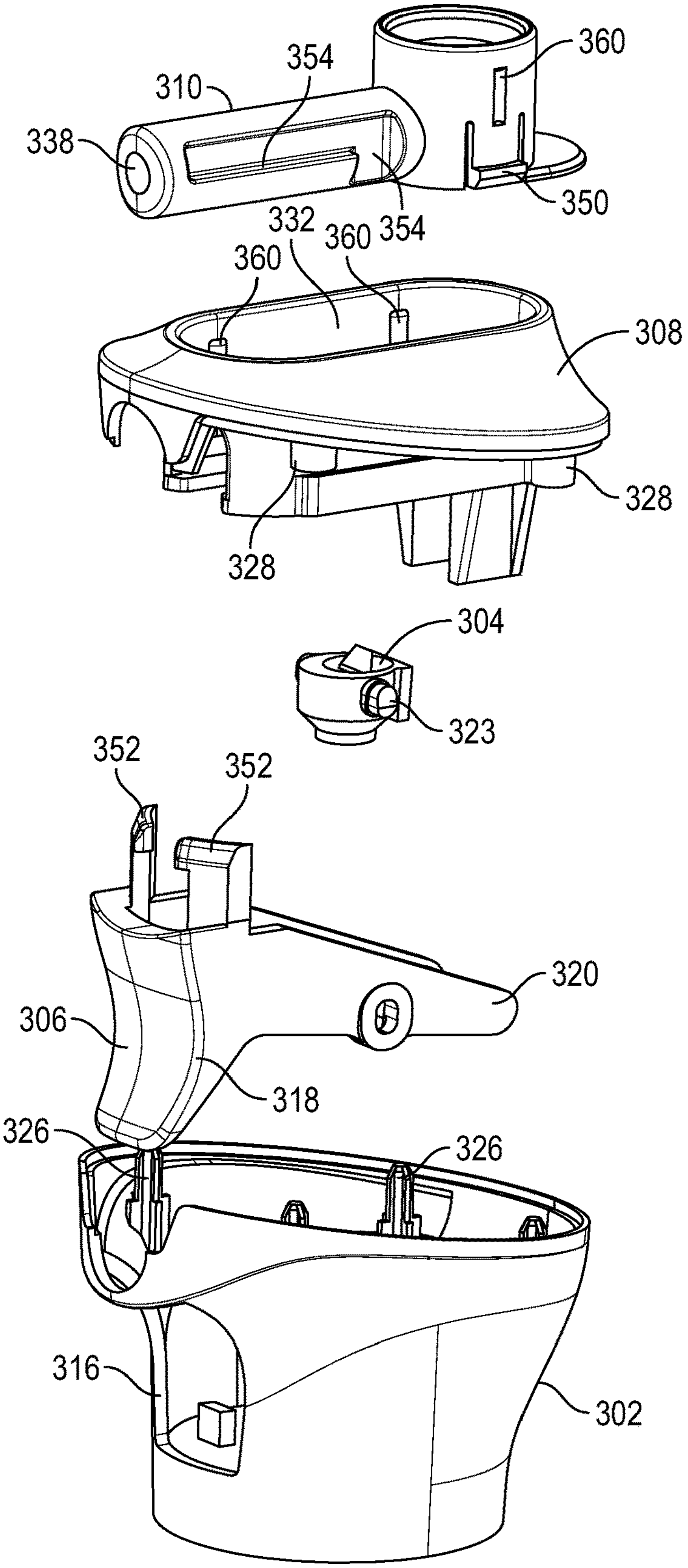
FIG. 25 is an exploded perspective view thereof.
Figure 26:
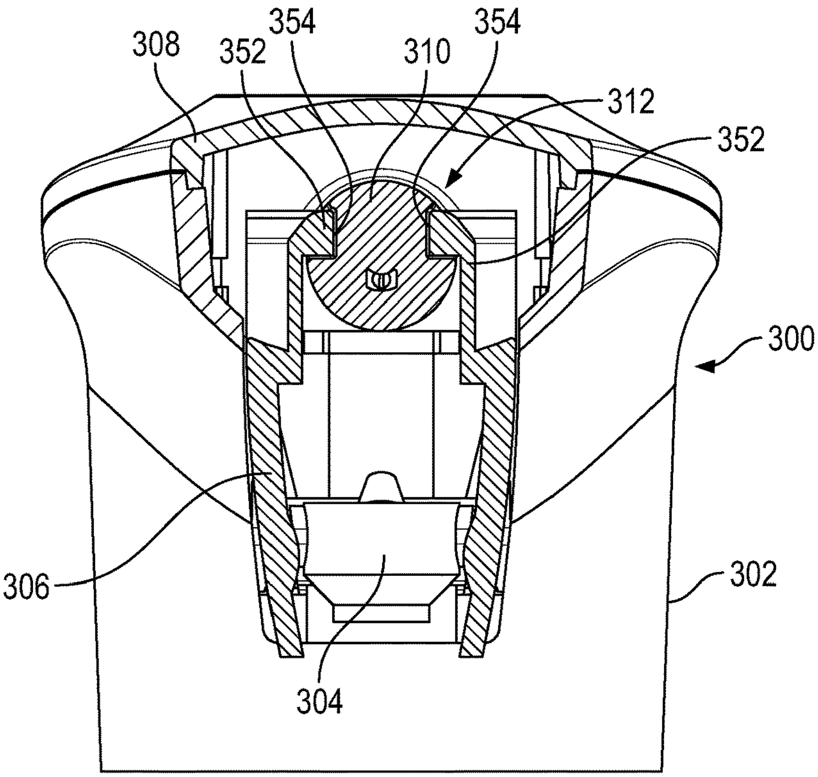
FIG. 26 is a cross-sectional view thereof taken along line 26-26 of FIG. 23.
Figure 27:
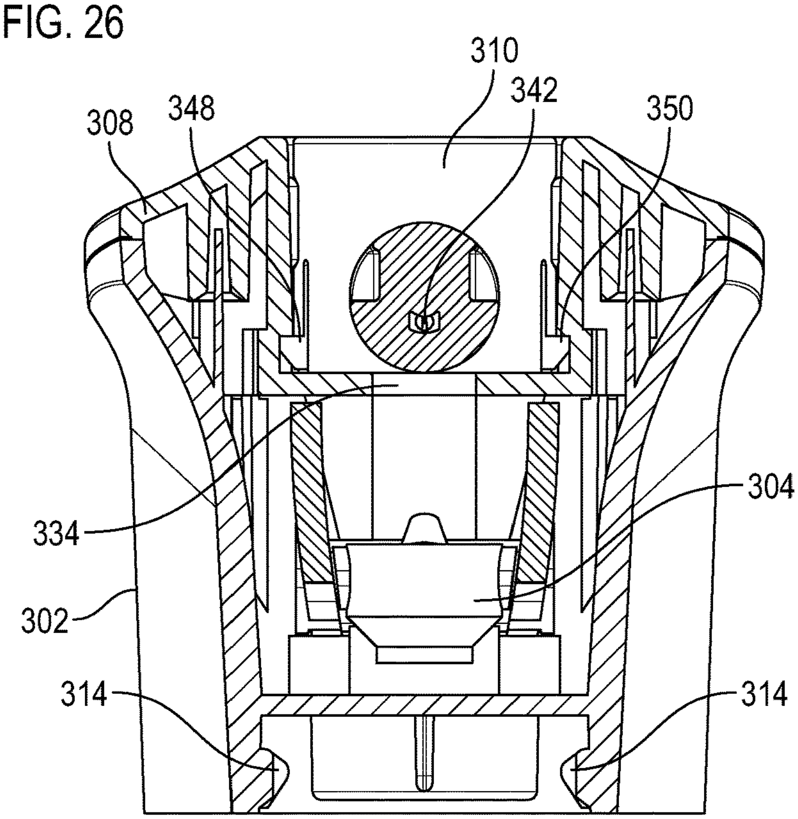
FIG. 27 is a cross-sectional view thereof taken along line 27-27 of FIG. 23.
Figure 28:
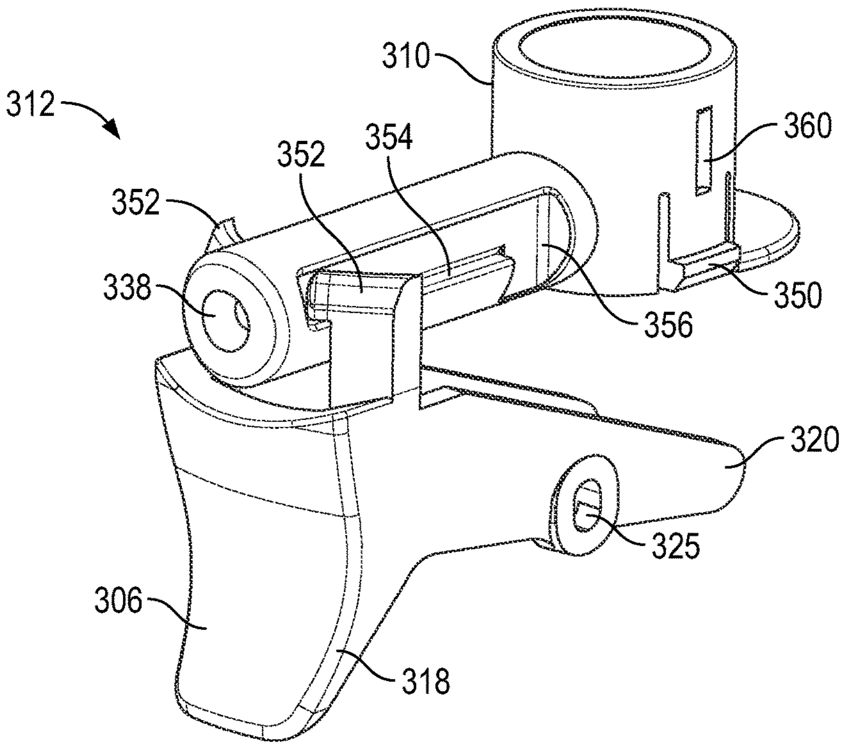
FIG. 28 is an enlarged perspective view of the trigger and nozzle in the retracted position.
Figure 30:
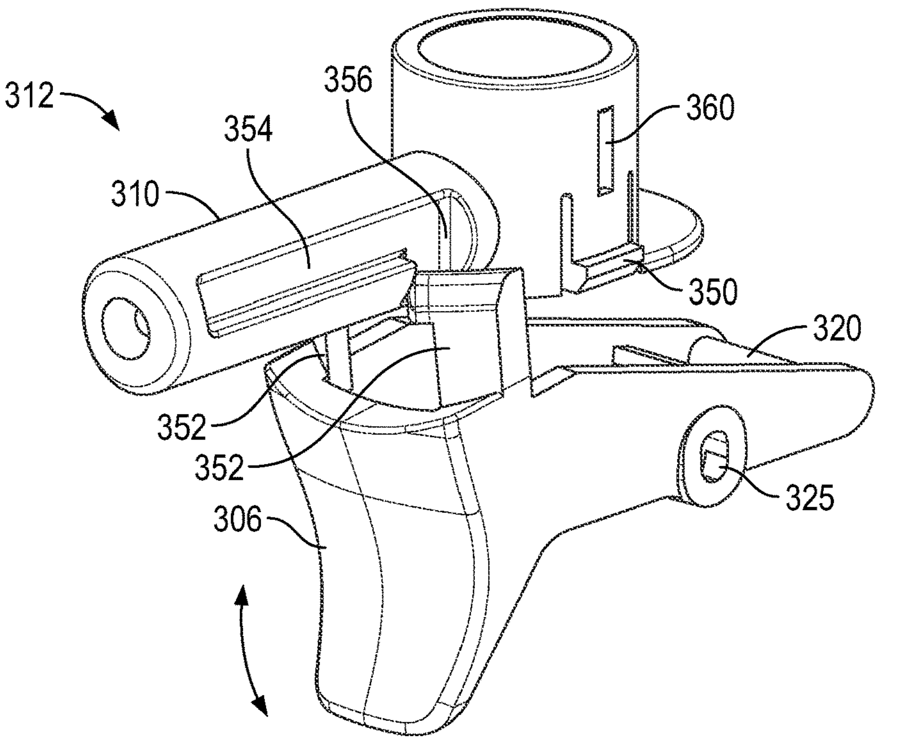
FIG. 30 is an enlarged perspective view of the trigger and nozzle in the extended position.
Figure 31:
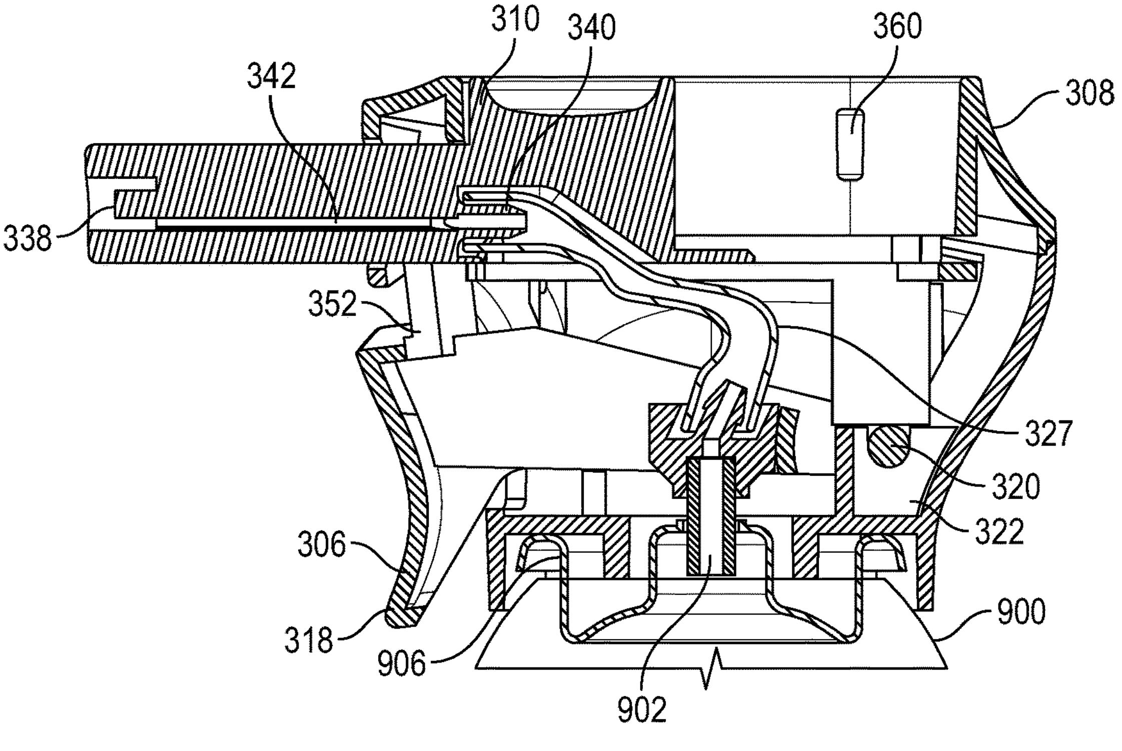
FIG. 31 is a cross-sectional view thereof taken along line 31-31 of FIG. 24.

The nozzle 310 is slidably received within the guide channel 332 wherein the nozzle 310 and the cap 308 are configured and arranged for sliding movement of the nozzle 310 between a retracted (shipping and storage) position (FIGS. 23, 28 and 29) and an extended (operable use) position (FIGS. 24, 30 and 31).

The nozzle body 310 and the guide channel 332 may include interfitting guides or shoulders for retaining the nozzle body 310 within the guide channel 332 and for guiding sliding movement of the nozzle 310 within the guide channel 332. Some embodiments of the guides may include grooves 348 formed within the side walls of the guide channel 332 and corresponding shoulders or spring projections 350 formed on the outer side surfaces of the nozzle body 310.

Some embodiments of nozzle 310 and cap 308 may include interfitting detents 360 which indicate and define with a tactile snap action, the retracted and extended positions (See FIGS. 23 and 24).

The locking mechanism 314 of the aerosol sprayer 300 may in some embodiments comprise a latch on the trigger 306 and a latch receiver on the nozzle body 310. More specifically, the latch may comprise opposed L-shaped latch arms 352 which extend upwardly and inwardly from a forward portion of the trigger 306. The corresponding latch receiver may comprise opposed elongated grooves 354 on the side surfaces of the nozzle 310. The rearward end of the grooves include a release notch 356 which permits downward movement of the latch arms 352 during trigger operation when the nozzle 310 is in the extended position (See FIG. 30).

In operable use of the aerosol sprayer 300, the locking mechanism 312 is locked and the trigger is inoperable when the nozzle 310 is in the retracted position (FIGS. 23, 28 and 29), and the locking mechanism 312 is released and the trigger 306 is operable when the nozzle 310 is slid forwardly into the extended position (FIGS. 24, 30 and 31).

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An aerosol sprayer, comprising:
a base;
a manifold;
a cap received with the base;
a sliding nozzle received within a guide channel in the cap and connected to the manifold; and
a trigger pivotably attached to the base and operably engaged with the manifold and cap; and
wherein the sliding nozzle is slidably movable along the guide channel between a retracted position and an extended position.

2. The aerosol sprayer of claim 1, further comprising a trigger locking mechanism comprising:
at least one groove on the sliding nozzle;
a release notch at one end of the groove; and
at least one latch arm on the trigger, wherein the at least one latch arm is seated in the at least one groove in a locked position and seated in the release notch in an unlocked position.

3. The aerosol sprayer of claim 1, wherein the sliding nozzle further comprises an exit orifice adjacent the cap in a locked position and extended away from the cap in an unlocked position.

4. The aerosol sprayer of claim 1, wherein the sliding nozzle is movable relative to the cap between a locked position and an unlocked position.

5. The aerosol sprayer of claim 1, wherein the sliding nozzle is movable relative to the cap between a locked position preventing movement of the trigger and an unlocked position allowing movement of the trigger.

6. The aerosol sprayer of claim 1, wherein the sliding nozzle further comprises:
an exit orifice at a distal end;
an inlet port at a proximal end; and
a discharge path extending between the inlet port and the exit orifice.

7. The aerosol sprayer of claim 6, wherein the inlet port is connected to the manifold.

8. The aerosol sprayer of claim 6, further comprising a flexible hose connecting the inlet port to the manifold.

9. The aerosol sprayer of claim 1, wherein the sliding nozzle further comprises opposed grooves on opposite sides of the nozzle.

10. The aerosol sprayer of claim 1, further comprising:
at least one groove in the guide channel in the cap; and
at least one shoulder on the sliding nozzle seated in the at least one groove.

11. The aerosol sprayer of claim 1, wherein the manifold further comprises a flexible manifold hose.

12. The aerosol sprayer of claim 1, further comprising:
an aerosol container attached to the base;
a valve stem attached to the aerosol container, wherein the manifold is connected to the valve stem and comprises a manifold outlet;
an inlet port in the sliding nozzle; and
a manifold hose connected to the manifold outlet and the inlet port.

13. The aerosol sprayer of claim 1, further comprising an aerosol container attached to the base.

14. The aerosol sprayer of claim 13, further comprising a valve stem attached to the aerosol container, wherein the manifold is in communication with the valve stem.

15. An aerosol sprayer, comprising:
a base;
a cap received with the base;
a sliding nozzle received within the cap, comprising:
an exit orifice;
an inlet port;
a discharge path between the inlet port and the exit orifice;
opposed grooves on side surfaces of the sliding nozzle; and
opposed release notches at rearward ends of the opposed grooves;
a trigger pivotably attached to the base, comprising opposed latch arms engaging the sliding nozzle;
a manifold comprising a manifold outlet; and
a hose connected to the manifold outlet and the inlet port of the sliding nozzle.

16. The aerosol sprayer of claim 15, wherein the opposed latch arms of the trigger engage the opposed grooves of the sliding nozzle in a locked position and wherein the opposed latch arms of the trigger are seated in the opposed release notches of the sliding nozzle in an unlocked position.

17. The aerosol sprayer of claim 15, wherein the exit orifice of the sliding nozzle is adjacent the cap in an unlocked position and wherein the exit orifice of the sliding nozzle extends away from the cap and trigger in an unlocked position.

18. An aerosol sprayer, comprising:
an aerosol container;
an aerosol valve attached to the aerosol container;
a base attached to the aerosol container;
a cap attached to the base;
a sliding nozzle received in the cap, comprising:
 an exit orifice;
 an inlet port;
 a discharge path between the inlet port and the exit orifice;
 opposed grooves on side surfaces of the sliding nozzle; and
 opposed release notches at rearward ends of the opposed grooves;
a trigger pivotably attached to the base, comprising opposed latch arms engaging the opposed grooves of the sliding nozzle, wherein engagement of the opposed latch arms with the opposed grooves prevents actuation of the aerosol sprayer and engagement of the opposed latch arms with the opposed release notches allows actuation of the aerosol sprayer.

19. The aerosol sprayer of claim 18, wherein the sliding nozzle may be moved between a locked position and an extended unlocked position.

20. The aerosol sprayer of claim 18, wherein extension of the sliding nozzle into a position in which the opposed latch arms engage the opposed release notches extends the exit orifice away from a finger of an operator actuating the trigger.

* * * * *